UNITED STATES PATENT OFFICE.

WALTER WEBER, OF DUSSELDORF, GERMANY, ASSIGNOR TO THE FIRM OF HENKEL & CIE., OF DUSSELDORF, GERMANY.

PROCESS OF MANUFACTURING MAGNESIUM PERBORATE.

1,124,081.      Specification of Letters Patent.      Patented Jan. 5, 1915.

No Drawing.      Application filed February 9, 1914. Serial No. 817,700.

*To all whom it may concern:*

Be it known that I, WALTER WEBER, a citizen of the German Empire, and residing at Dusseldorf, Germany, have invented a certain new and useful Improved Process of Manufacturing Magnesium Perborate, of which the following is a specification.

The subject-matter of this invention is an improved process of manufacturing magnesium perborate.

I have found that it is possible to make a magnesium perborate of constant chemical composition and good solubility without any technical difficulty by melting magnesium salts with alkali metal perborate. Of the magnesium salts those are suitable for use whose anions form with the alkali metal of the perborate salts containing water of crystallization.

Example: 1 molecular proportion of magnesium sulphate ($MgSO_4.7H_2O$) is mixed with 2 molecular proportions of sodium perborate ($NaBO_3.4H_2O$), the mixture is melted in the water bath at a temperature of 65° to 70° C. and maintained for a time at this temperature while being stirred. On cooling, the mass congeals, can be readily cut into small pieces and after being completely dried can be pulverized. The yield according to the described process is almost quantitative and the stability of the product is excellent.

The advantages of the process are, on the one hand, its exceedingly great simplicity and short duration and, on the other hand, the constant chemical composition of the resulting final products, whereby the uniformity of their properties is guaranteed, which is of great importance particularly in the case of a body containing active oxygen. Also, for most purposes of employment the solubility of the magnesium perborate obtained by the present process, which however is considerably less than that of alkali metal perborate, is of advantage. Further, the magnesium perborate obtained is specially suitable for pharmaceutical and cosmetic purposes owing to its stability, slight alkalinity, and to its high percentage of oxygen which admits of the admixture of relatively large quantities of other substances without causing the degree of concentration of active oxygen to become too low, and also owing to the lack of all taste.

To produce magnesium perborate by grinding a mixture of sodium perborate and a magnesium salt in water is already known. In this conversion, however, a strong decomposition occurs owing to the presence of excess water whereby a considerable part of the valuable active oxygen is lost. Further losses arise through the subsequent filtration treatment by centrifugal force, or drying of the perborates obtained in the wet process. Such losses are avoided by the present invention which comprises a simple fusion process. Furthermore, a more stable final product is obtained by this fusion process, the contents of which in active oxygen are comparatively constant. The present process is therefore not only simpler but the yield thereof is greater and more certain.

I claim:—

1. A process of manufacturing magnesium perborate consisting in melting an alkali metal perborate with a magnesium salt whose anions are able to form with the alkali metal of the perborate, salts containing water of crystallization.

2. A process of manufacturing magnesium perborate consisting in melting and simultaneously stirring an alkali metal perborate with a magnesium salt whose anions are able to form with the alkali metal of the perborate, salts containing water of crystallization.

3. A process of manufacturing magnesium perborate consisting in melting magnesium sulfate with an alkali metal perborate while constantly stirring the same.

4. A process of manufacturing magnesium perborate consisting in melting sodium perborate with a magnesium salt whose anions are able to form with the alkali metal of the perborate, salts containing water of crystallization.

5. A process of manufacturing magnesium perborate consisting in melting magnesium sulfate with sodium perborate while constantly stirring the same.

6. A process of manufacturing magnesium perborate consisting in mixing two molecular proportions of an alkali metal perborate with one molecular proportion of a magnesium salt whose anions are able to form with the alkali metal of the perborate salts containing water of crystallization, in melting the mixture at temperature of from 65° to 70° C. and in maintaining it at this temperature for a time while stirring the same, and in then allowing the molten mixture to cool.

7. A process of manufacturing magnesium perborate consisting in mixing one molecular proportion of magnesium sulfate with two molecular proportions of sodium perborate, in melting the mixture at a temperature of from 65° to 70° C. and in maintaining it at this temperature for a time while stirring the same, and in then allowing the molten mixture to cool.

In testimony whereof, I affix my signature in the presence of two witnesses.

WALTER WEBER. [L. S.]

Witnesses:
 HELEN NUFER,
 ALBERT NUFER